(12) United States Patent
Girardin et al.

(10) Patent No.: US 12,420,677 B2
(45) Date of Patent: Sep. 23, 2025

(54) MANUAL TRACK FITTINGS

(71) Applicant: Valeda Company, LLC, Oakland Park, FL (US)

(72) Inventors: Patrick Girardin, Lauderdale, FL (US); Robert Andrew Cumming, Crowley (GB); James Douglas Wiles, Whistable (GB); Bryan David Platt, Whitstable (GB)

(73) Assignee: Valeda Company, LLC, Oakland Park, FL (US)

( * ) Notice: Subject to any disclaimer, the term of this patent is extended or adjusted under 35 U.S.C. 154(b) by 285 days.

(21) Appl. No.: 18/168,696

(22) Filed: Feb. 14, 2023

(65) Prior Publication Data

US 2023/0257026 A1     Aug. 17, 2023

Related U.S. Application Data

(60) Provisional application No. 63/310,676, filed on Feb. 16, 2022, provisional application No. 63/323,679, filed on Mar. 25, 2022.

(51) Int. Cl.
*B60N 2/015*     (2006.01)
*B60P 7/08*     (2006.01)
(Continued)

(52) U.S. Cl.
CPC ....... *B60N 2/01525* (2013.01); *B60N 2/0155* (2013.01); *B60P 7/0815* (2013.01); *B62D 25/2009* (2013.01); *B64D 11/0696* (2013.01)

(58) Field of Classification Search
CPC ................ B60N 2/015; B60N 2/01558; B60N 2/01525; B60N 2/0155; B60N 2/02;
(Continued)

(56) References Cited

U.S. PATENT DOCUMENTS 3,189,313 A * 6/1965 Burns .................... B64D 9/003
16/93 R
5,890,768 A * 4/1999 Beurteaux .......... B60N 2/01558
297/216.16
(Continued)

FOREIGN PATENT DOCUMENTS

| DE | 102010037754 B4 * | 9/2019 | ............ B60P 7/0815 |
| EP | 1034969 B1 | 6/2005 | |
| WO | 1996015025 A1 | 5/1996 | |

OTHER PUBLICATIONS translation.*
(Continued)

*Primary Examiner* — Amy R Weisberg
*Assistant Examiner* — Denise Lynne Esquivel
(74) *Attorney, Agent, or Firm* — Daniel Tallitsch; Tyler Schultz

(57) ABSTRACT

A track fitting for securing a structure to an open-top channeled track may include at least one leaf having a flange portion that depends at an angle from a levering portion, and at least one fastener for connecting the levering portion to the structure, wherein in a secured condition, the flange portion is oriented for engagement with an underside of at least one of the two inwardly directed lips and the levering portion extends outside the open-top channel where the fastener secures the levering portion to the structure.

31 Claims, 9 Drawing Sheets

(51) Int. Cl.
*B62D 25/20* (2006.01)
*B64D 11/06* (2006.01)

(58) Field of Classification Search
CPC .. B60N 2/01508; B60N 2/01516; B60N 2/07; B62D 25/2009; B64D 11/0696; B60P 1/43; B60P 7/0815; A61G 3/02
USPC .................. 296/65.01, 65.03, 65.04, 193.07
See application file for complete search history.

(56) References Cited

U.S. PATENT DOCUMENTS

| | | | |
|---|---|---|---|
| 5,937,706 A * | 8/1999 | Sawdy | B60N 2/01558 297/344.1 |
| 7,637,705 B2 | 12/2009 | Girardin et al. | |
| 8,991,778 B2 * | 3/2015 | Koller | B60N 2/005 296/65.13 |
| 2019/0002107 A1 * | 1/2019 | Mair | B64D 11/0696 |
| 2020/0155386 A1 * | 5/2020 | Kumar | B62D 25/2054 |
| 2021/0147004 A1 * | 5/2021 | Sandell | A61G 3/062 |
| 2023/0010694 A1 | 1/2023 | Wiles et al. | |

OTHER PUBLICATIONS

International Search Report and Written Opinion, PCT/US2023/062664, dated Jun. 19, 2023, 12 pages, International Search Authority for the European Patent Office.

* cited by examiner

MANUAL TRACK FITTINGS

CROSS REFERENCE TO RELATED APPLICATIONS

This application claims priority to U.S. Provisional Patent Application Nos. 63/310,676, filed on Feb. 16, 2022, and 63/323,679, filed on Mar. 25, 2022, the contents of which are incorporated herein by reference.

FIELD OF THE DISCLOSURE

The embodiments described and claimed herein relate generally to structures and fittings adapted for and methods for removably engaging various structures—including but not limited to seat supports for supporting a seat in a vehicle, wheelchair lifts, wheelchair ramps, wheelchair securements, and occupant restraints—with a track in the vehicle.

BACKGROUND

Commercial and other special-use vehicles, including but not limited to buses, vans and aircraft, are often outfitted with longitudinally- or laterally extending tracks in or on the floor that are configured to receive, engage with, and support various structures, such as seats and wheelchair securement systems. The tracks permit flexible arrangement and easy installation and removal of such structures anywhere along the length of the tracks. One of the most widely used track is referred to in the industry as L-track and is shown in FIG. 1. The track 1 is generally formed from extruded aluminum in a generally C-shape. An open channel 2 extends lengthwise along the top surface of the track 1 with undercuts 11, 13 extending under the top surface 14 of the track to either side of the open channel 2. A series of equally spaced holes 3 are drilled or formed along the length of the open channel 2 to define two opposing, scalloped, inwardly directed lips 4, 5. Each of the lips 4,5 may be described as having opposing faces 6,7 that may be generally vertical and undersides 8, 9, that may be sloped relative to a horizontal. Notably, the opposing faces 6, 7 and undersides 8, 9 may be oriented at other angles. The undersides 8, 9 may be described as having a root portion 15, 17 defined by the continuous longitudinal surface of the undersides 8, 9 that is uninterrupted by the holes 3 (i.e., the roots 15, 17 may be defined by a longitudinal strip deep in the undercuts 11, 13).

Various fittings configured for engagement with the track 1 are commercially available. See, for example, U.S. Pat. No. 7,637,705 (the '705 patent), incorporated herein by reference, which discloses a track fitting with visual indicia of engagement. The device disclosed in the '705 patent is commercially available from Q'Straint and is typically used to secure wheelchair tie-downs to the floor.

Another prior art fitting configured to secure structures, in this instance a seat, to a floor track is disclosed in EP1034969B1 (the '969 patent), incorporated herein by reference. The device disclosed in the '969 patent is commercially available from NMI Safety Systems, Ltd., and is typically used to secure seat legs to the floor. Q'Straint has developed an improvement to the NMI fitting, which is disclosed in U.S. Application No. 63/219,872 (the '872 application), incorporated herein by reference.

While the commercial embodiments of the '705 and '969 patents have both been accepted as floor securement solutions, they both have multiple shortcomings, as does the fitting of the '872 application. For example, one or more include multiple parts requiring expensive assembly, have moving parts subject to wear and tear, and/or require expensive castings to manufacture.

SUMMARY OF THE EMBODIMENTS

Clearly, the prior art devices have limitations which the present embodiments overcome. Various new embodiments of a manual blade track fitting are contemplated that solve those limitations, which embodiments comprise combinations of any one or more of the following features or other features described elsewhere in this disclosure:

A track fitting that is adapted to secure a structure to a track. The track has an open-top channel defined by two inwardly directed lips.

The track fitting comprising at least one flange member, wherein the flange member includes a flange depending from a connecting portion.

The flange is insertable between the two inwardly directed lips and is adapted for engagement with an underside of at least one of the two inwardly directed lips. The structure includes a lower section that is insertable between the two inwardly directed lips.

The connecting portion of the flange member is configured to connect to and to lie substantially adjacent the structure when the flange is engaged with the underside.

The flange member and the structure are capable of insertion separately and consecutively in the open-top channel prior to being connected together.

The lower section of the structure includes a substantially planar portion adapted for insertion into the open-top channel.

The substantially planar portion is oriented generally parallel to a plane defined by two opposing faces of the two inwardly directed lips.

The connecting portion of the flange member is disposed substantially adjacent to the lower section of the structure in a connected position.

The lower section of the structure includes a second flange configured for receipt within an undercut of the other of the two inwardly directed lips.

A second flange member is provided with a second flange depending from a second connecting portion.

The second flange is insertable between the two inwardly directed lips and is adapted to engage with an underside of the other of the two inwardly directed lips.

The connecting portion of the second flange member is configured to connect to and to lie substantially adjacent an opposite side of the structure when the second flange is engaged with the underside.

The flange member, the second flange member, and the structure are capable of insertion separately and consecutively in the open-top channel prior to being connected together.

The flange member includes a structural member at extending from the connecting portion to provide additional rigidity.

The structural member extends at an angle from an upper end of the connecting portion.

The structural member extends at a first angle from an upper end of the connecting portion, while the flange extends at a second, different angle from a lower end of the connection portion, whereby the flange member can be used in a flange-down position in a first track of a first geometry and in a structural-member down position in a second track of a second, different geometry, with the structural member serving as a second flange.

The structural member extends from an upper end of the connecting portion with a first geometry, while the flange extends at a second, different geometry from a lower end of the connection portion, whereby the flange member can be used in a flange-down position in a first track of a first geometry and in a structural-member down position in a second track of a second, different geometry, with the structural member serving as a second flange.

The first and second geometries are a first length of the flange and a second, different length of the structural member.

A length of the flange member is configured to be aligned parallel with a length of the open-top channel in a connected position.

The track includes a plurality of holes along the length of the open-top channel, whereby the two inwardly directed lips have a scalloped geometry.

The structure includes a peg adapted for receipt within at least one of the plurality of holes.

The two inwardly directed lips have a non-scalloped geometry.

The structure includes a foot for engaging with the track to resist longitudinal movement along a length of the track.

The flange extends at an angle from a lower end of the connecting portion, whereby the connecting portion is a levering portion configured to lever the flange toward engagement with the underside.

The levering portion, when connected to the structure, creates a clamping force with the flange engaged with the underside and the structure engaged with a bottom surface of the open-top channel.

An interface between the flange and the levering portion is a bend, the bend serving as a fulcrum.

A method for using a track fitting, the method comprising the steps of: inserting the at least one flange member and the structure into the open-top channel, angling the connecting portion of the at least one flange member toward the structure, and inserting and securing fasteners to connect the at least one flange member to the structure and track.

The at least one flange member and the structure are inserted simultaneously.

The at least one flange member and the structure are inserted in any order.

A quantity of the at least one flange member is at least two flange members, where a first and a second of the at least two flange member sandwich the structure in a connected position.

The structure is a seat leg.

Further forms, objects, features, aspects, benefits, advantages, and embodiments will become apparent from the detailed description and drawings provided herewith.

BRIEF DESCRIPTION OF DRAWINGS

These and other features, aspects, objects, and advantages of the embodiments described and claimed herein will become better understood upon consideration of the following detailed description, appended claims, and accompanying drawings.

Figure 1:
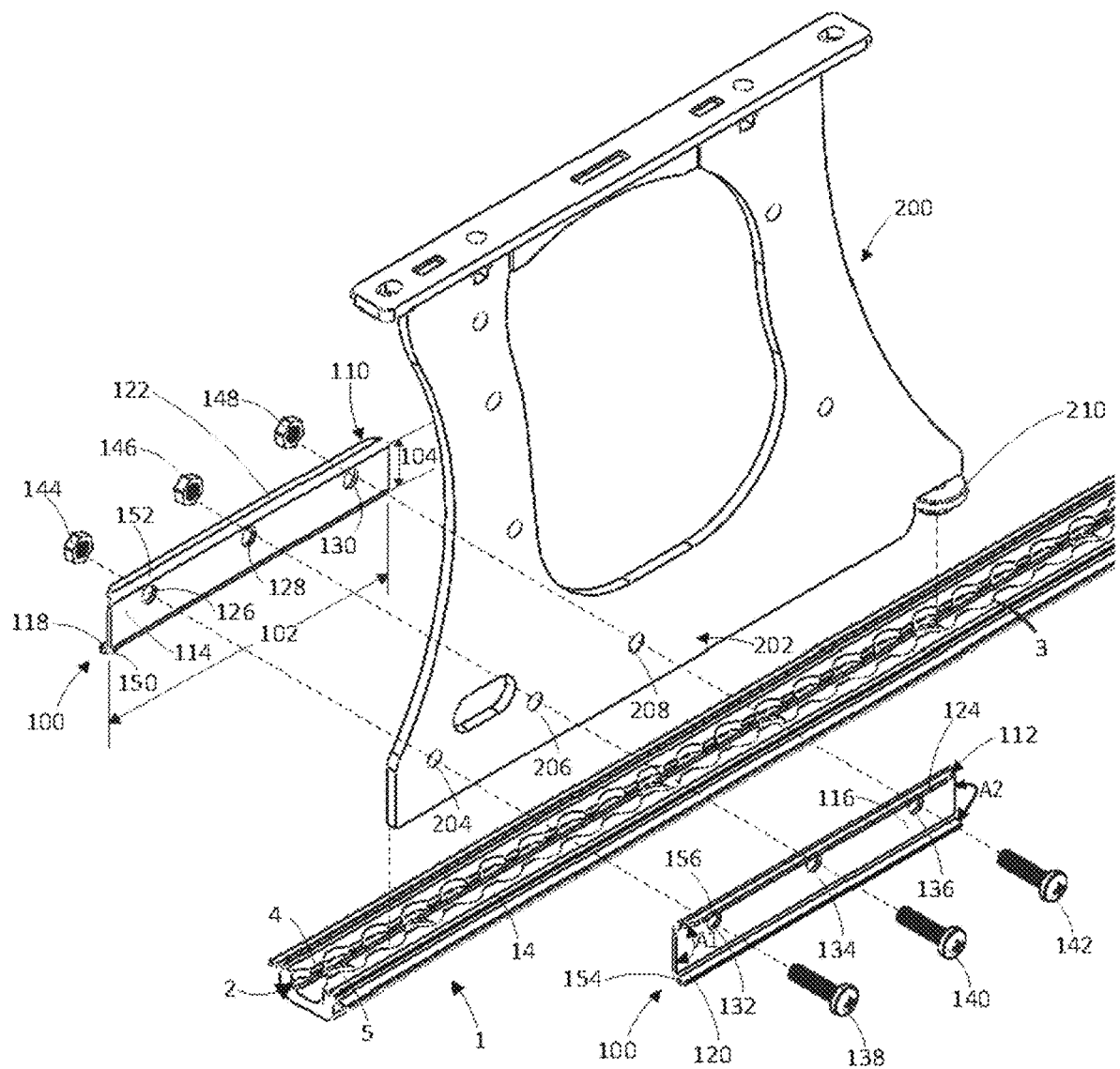
FIG. 1 is an exploded perspective view of a first embodiment of a manual leaf assembly for use in securing a seat leg to a floor-mounted track.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE EMBODIMENTS

For the purpose of promoting an understanding of the principles of the inventions, reference will now be made to the embodiments illustrated in the drawings and specific language will be used to describe the same. It will nevertheless be understood that no limitation of the scopes of the inventions is thereby intended. Any alterations and further modifications in the described embodiments and any further applications of the principles of the inventions as described herein are contemplated as would normally occur to one skilled in the art. Although a limited number of embodiments are shown and described, it will be apparent to those skilled in the art that some features that are not relevant to the claimed inventions may not be shown for the sake of clarity.

With reference first to FIGS. 1-5, a first embodiment of a manual leaf fitting (or manual flange fitting) 100 is shown in typical configurations, with a length (or longitudinal axis) 102 that may be aligned parallel to a length of a track 1 for locking engagement. The track 1 may be of several different types, including but not limited to an L-track type, which includes a series of equally spaced holes 3, or may be of a Unistrut type, which is the same or similar to L-track but does not include holes 3. Typically, the track 1 is installed in a floor of a vehicle with the length of the track 1 aligned from front to rear of the vehicle. In that respect, the length (or longitudinal axis) 102 of the manual leaf fitting 100 may be generally horizontal or generally parallel to the floor, while the height 104 of the manual leaf fitting 100 may be generally vertical or perpendicular to the floor. However, the track 1 may be installed on other surfaces, including those oriented vertically, upside down, or at any other angle. For purposes of this description, it is assumed that the fitting 100 is installed in a floor-mounted track 1 where the height 104 of the fitting 100 is aligned vertically. In that respect, the term vertically is used in the description and claims to refer to a direction extending out of the top of the open channel 2 (and, of course, in the opposite direction through the bottom surface of the open channel 2) and generally or roughly parallel to a plane defined by the opposing faces 6, 7 of the track lips 4, 5.

The fitting 100 may include at least one leaf (or flange member) or, as shown, two leaves (or flange members): a first leaf (or flange member) 110 and a second leaf (or flange member) 112, which generally sandwich the structure (including but not limited to a portion or extension thereof) being secured to the track 1. Ideally, the structure being secured is a plate structure, for example the base 202 of a seat leg 200 as shown. While the following description describes how a seat leg 200 may be secured to a track 1 using the fitting 100, it should be understood that the same or similar methods and structures can be used to secure any structure to the track.

The first leaf 110 and second leaf 112 may be reversible or non-handed as shown, in that they are identical and can be used on either side of the seat leg (by rotating them 180° about a vertical axis). The leaves 110, 112 may comprise a levering portion (or a connecting portion) 114, 116 and a first flange portion 118, 120 located at one end of the levering portion 114, 116, and may additionally include a second flange portion 122, 124 located at the opposite end of the levering portion 114, 116. In that respect, the leaves 110, 112 may in some embodiments resemble a half-I-beam in shape (i.e., a channel, which is generally C-shaped in cross section with flange surfaces that come out on one side of the levering portion, or bowl shaped when viewed rotated 90°).

As will be described hereinafter, the levering portions 114, 116 are used to secure the leaves 110, 112 to the seat leg 200, while one set of flanges 114, 116, 118, 120 are used to engage with the track 1 (for example, the undersides 8, 9 of the track), thereby securing the seat leg 200 to the track 1. The other set of flanges 122, 124 may then serve as structural reinforcing members that add rigidity and strength to the leaves 110, 112. In the absence of a second set of flange portions 122, 124, structural reinforcing members may nonetheless be present, which reinforcing members may resemble the second set of flange portions 122, 124 in that they will extend at an angle or divert from the levering portions 114, 116.

For securing the leaves 110, 112 to the seat leg 200, the levering portions 114, 116 may each include at least one aperture, in this case three apertures 126, 128, 130, 132, 134, 136 each which align with each other and with corresponding apertures 204, 206, 208 in the base 202 of the seat leg 200, as illustrated by dashed lines in FIG. 1, and which receive fasteners, in this case bolts 138, 140, 142 and nuts 144, 146, 148.

The first flange portion 118, 120 may be identical to the second flange portion 122, 124, whereby the leaves 110, 112 do not have a top side or a bottom side, and can be used in either orientation. In some embodiments, however, the first flange portion 118, 120 may be different from the second flange portion 122, 124 (for example, they may extend from the levering portion 114, 116 at a different angles A1 and A2 for compatibility with undersides 8,9 oriented at different angles, and/or they may have different lengths for compatibility with deeper or shallower undercuts 11, 13 or deeper or shallower open channels 2), whereby the leaves 110, 112 may be used with one flange down for a first track and may be used with the other flange down for a second track that has a different configuration or geometry.

Ideally, although not essential, the flange portions 118, 120, 122, 124 merge with the levering portions 114, 116 at smooth bends 150, 152, 154, 156, rather than sharp corners, to assist in the levering action described hereinafter. Moreover, while certain portions of the leaves 110, 112 are shown as flat or planar in shape, they may be curved, flat, or a combination thereof, and may vary in thickness.

For the avoidance of doubt, the lengths and thickness of the leaves 110, 112 and the number of apertures 126, 128, 130, 132, 134, 136, 204, 206, 208 can be varied depending upon strength requirements. The geometry/configuration of the leaves 110, 112 can also be adjusted to adjusted to suit or accommodate a stronger or weaker track 1.

In one embodiment, the leaves 110, 112 may be formed (e.g., cut, stamped, bent, drilled) from a sheet material, preferably a metal material with resilient properties.

The flanges 118, 120, 122, 124 may be oriented at an angle relative to vertical (i.e., connecting portion 114, 116) that generally corresponds to the angle of the undersides 8, 9 of the lips 4, 5, whereby the flanges 118, 120, 122, 124 will sit closely adjacent to the undersides 8,9 of the lips 4, 5 when the fitting 100 is secured in the track 1. Preferably, gaps between the flanges 118, 120, 122, 124 and the undersides 8, 9 will be either non-existent or relatively small (whereby the gaps will close when the fitting 100 experiences an upward force), the flanges 118, 120, 122, 124 will be parallel or closely parallel to the undersides 8, 9, and contact between the flanges 118, 120, 122, 124 (or other portions of the fitting 100) and the opposing faces 6, 7 will be non-existent, insignificant, or small. In one embodiment, the angle of the flanges 118, 120, 122, 124 may be approximately equal to, within a few degrees of, within 5° of, within 10° of, or within 15° of the angle of the undersides 8, 9. Alternatively, the angle of the flanges 118, 120, 122, 124 may be set at a "universal" angle relative to vertical so that the angle corresponds to many or most commercially available tracks. In one embodiment, the angle A2 of one set of flanges 122, 124 relative to vertical may be set at approximately 100° or approximately 105°, while the angle A2 of the other set of flanges 118, 120 relative to vertical may be set at approximately 95°. In other embodiments, angles A1 and A2 may each be the same (and therefore usable in an upright and upsidedown configuration) or both different (and therefore configured for two differently dimensioned track) and, in either case, may each be between approximately 75°-120°, or a narrower ranger therebetween (including between 90°-105°). Alternatively, the angle of the flanges 118, 120, 122, 124 may be set to within a few degrees of, within 5° of, within 10° of, or within 15° of 105°.

Figure 2:
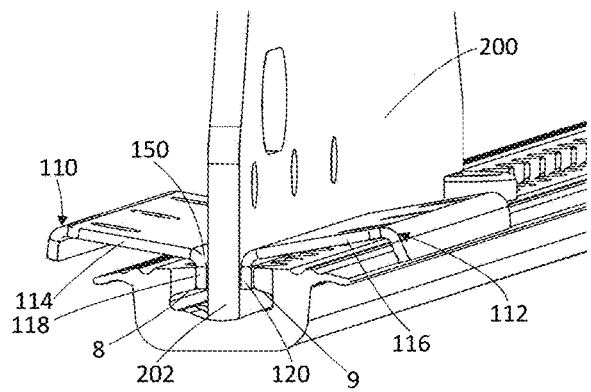
FIG. 2 is perspective view showing the first step in securing a seat leg to a floor mounted track using the manual leaf assembly of FIG. 1.

FIG. 2 shows the first step in a possible securement method using the fitting 100. In particular, the base 202 of the seat leg 200 (or any other plate structure) may be inserted into the open channel 2 of the track 1, allowing it to rest on the bottom surface of the track 1. The appropriate flanges, in this case the first flanges 118, 120 or two leaves 110, 112, are inserted into the open channel 2 on opposite sides of the base 202. The leaves 110, 112 may be allowed to hang to the sides as shown. In an alternative securement method, the leaves 110, 112 can be inserted first followed by the seat leg 200.

Figure 3:
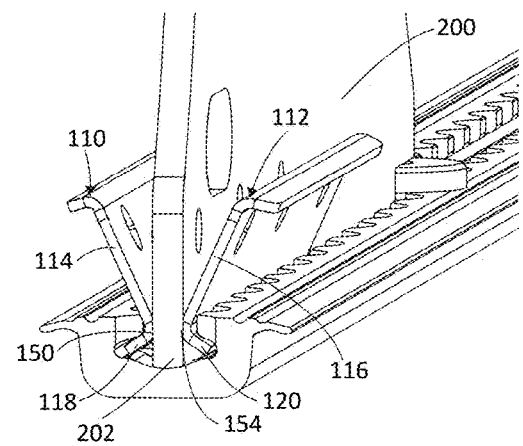
FIG. 3 is perspective view showing the second step in securing a seat leg to a floor mounted track using the manual leaf assembly of FIG. 1.

In the second step shown in FIG. 3, the leaves 110, 112 will be angled upward by hand, bringing the top ends of the leaves toward each other. If the leaves 110, 112 are dimensioned or configured in a preferable manner, resistance will be felt and the installer will be unable to or will find resistance bringing the levering portions 114, 116 flush with base 202 of the seat leg, and the levering portions 114, 116 will remain spaced from the base 202 as shown. However, the installer should at least be able to align apertures 126, 128, 130, 132, 134, 136 in the leaves 110, 112 with the apertures 204, 206, 208 in the base 202 of the seat leg 200.

Figure 4:
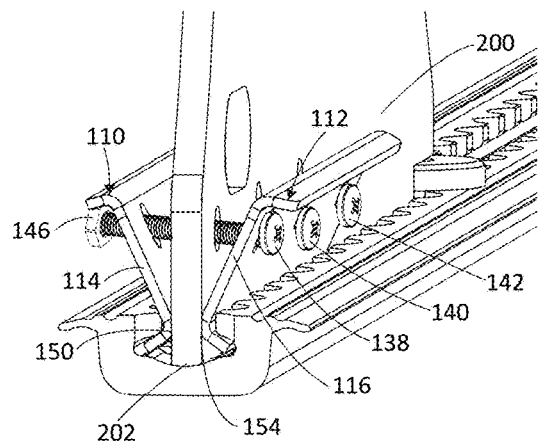
FIG. 4 is perspective view showing the third step in securing a seat leg to a floor mounted track using the manual leaf assembly of FIG. 1.

In that respect, in the third step shown in FIG. 4, the installer may insert bolts 138, 140, 142 through the apertures 126, 128, 130, 132, 134, 136, 204, 206, 208 and begin to thread the nuts 144, 146, 148 thereon.

Figure 5:
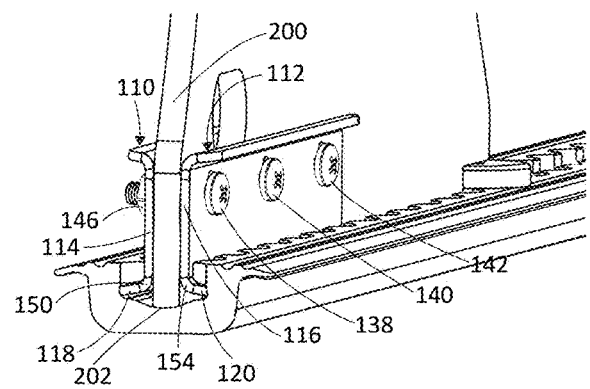
FIG. 5 is perspective view showing the fourth and final step in securing a seat leg to a floor mounted track using the manual leaf assembly of FIG. 1.

In the fourth and final step shown in FIG. 5, the installer may use tools, either or both hand and power tools, to fully tighten the nuts 144, 146, 148 on the bolts 138, 140, 142. The tension applied by the bolt forces the levering portions 114, 116 of the leaves 110, 112 to align flush with the base 202 of the seat leg and causes the flanges 118, 120 to engage with the track 1. Obviously, the bolting process applies force in an equal in opposite manner through the opposing leaves 110, 112, which prevents the system from moving laterally, i.e, it tends to keep the base 202 of the seat leg 200 centered in the open channel 2 of the track 1. To assist in this centering process, the flanges 110, 112 may have a length that enables contact with the outside faces of the undercuts 11, 13 during the levering action. As the levering portions 114, 116 move toward the base 202, a smooth levering action may occur around the bends 150, 154, which engage with the opposite faces of the base 202 of the seat leg. At the same time, the flanges 118, 120 may come into positive contact with at least one of the undersides 8, 9 (possibly including the root portion 15, 17) and outside faces of the track 1, which may have the effect of pushing the base 202 of the seat leg down into the bottom surface of the track 1. In doing so, the leaves 110, 112 become stressed/pre-loaded and provide a clamping force to resist movement of the seat leg 200 relative to the track 1 (up, down, side to side, and/or sliding longitudinally down the track), for instance during a vehicle accident, and may provide resistance to rattling of the seat in the track 1.

In some embodiments, the securement provided by the manual leaf fitting 100 may be sufficient to secure the seat leg 200 in the track. More particularly, the process of assembly locks the seat leg 200 in position without the need for a secondary securement or locking feature. However, in some instances, it may be desired to provide additional strength. In those instances, a second manual leaf fitting 100, or other form of fitting, may be provided, for example at the lead edge of the seat leg 200. As an alternative, the seat leg 200 may be provided with a foot 210 anywhere along its length that engages with the track 1. In one embodiment, the foot 210 may be a peg depending from the bottom, lead edge of the seat leg 200, the foot 210 having dimensions suitable for receipt and mating engagement in one of the holes 3 in the track 1. In this instance, the peg is cylindrical in shape to correspond with the circular shape of the holes 3. Engagement between the foot 210 and the hole 3 will provide additional resistance to movement of the seat leg 200, including along the length of the track and side to side. Being located at the lead edge of the seat leg 200, the foot 210 may experience a downward force during a forward excursion, which could tend to push the foot 210 deeper or more snugly within the hole 3. Notably, in cases where a foot 210 is not required or used, a different form track 1 can be used, in particular a possibly less-expensive one that omits the holes 3 (whereby the lips 6, 7 will not be scalloped).

Figure 6:
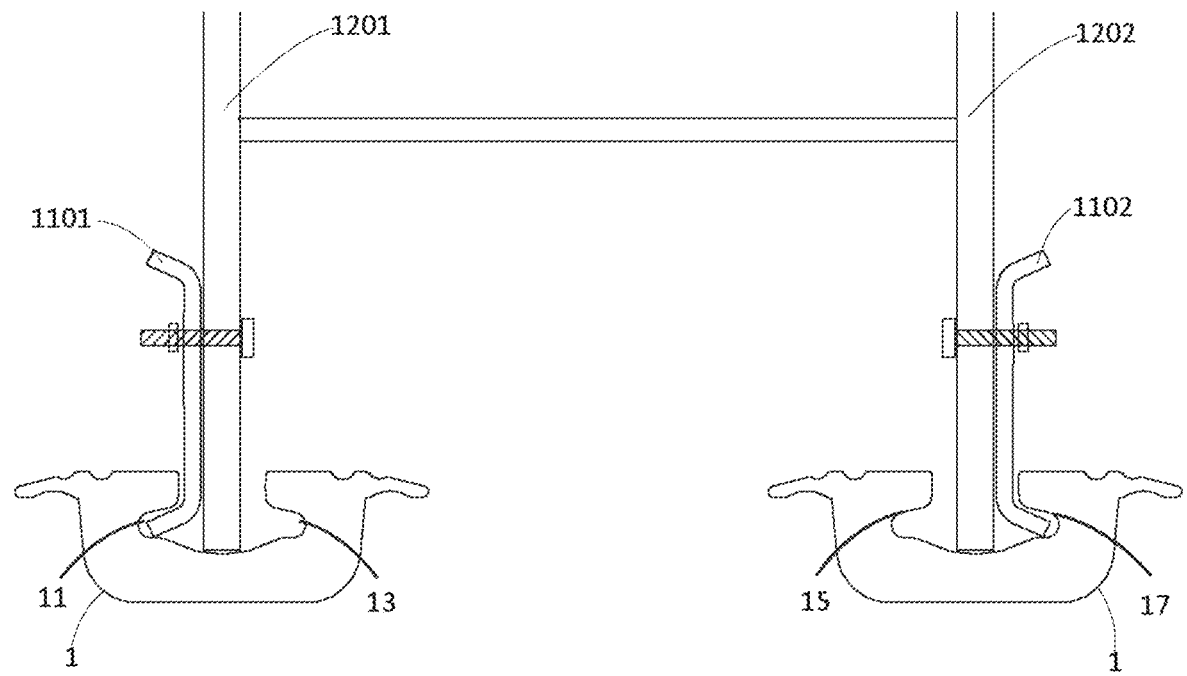
FIG. 6 is a front view showing a second embodiment of a manual leaf assembly for use in securing a seat leg to the floor-mounted track.
Figure 7:
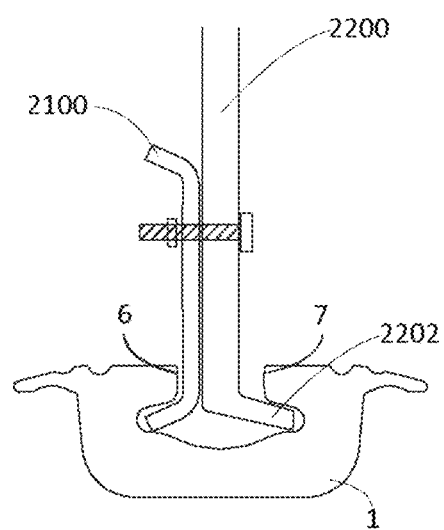
FIG. 7 is a front view showing a third embodiment of a manual leaf assembly for use in securing a seat leg to the floor-mounted track.
Figure 8:
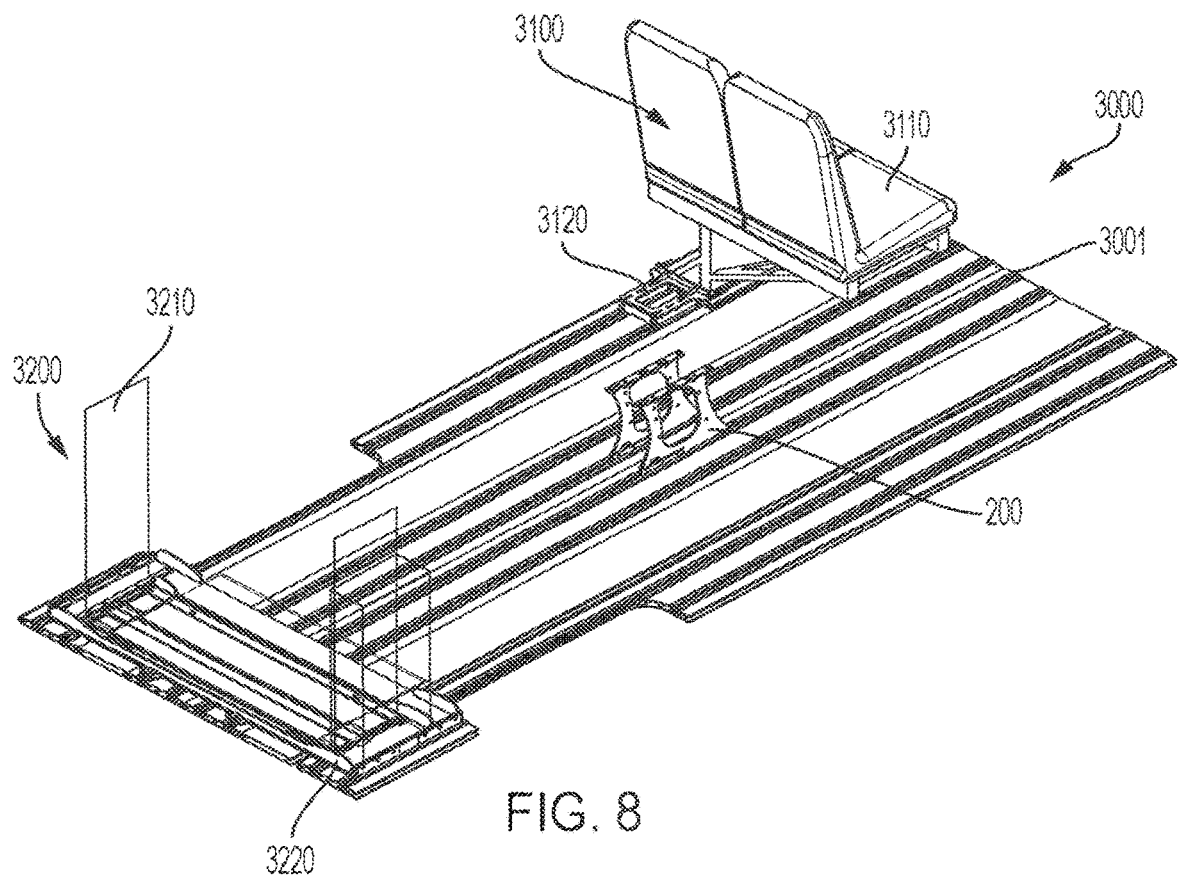
FIG. 8 is a perspective view of a first embodiment of a floor system for a vehicle which includes a standard seat assembly, a folding (fold away) seat assembly, and a wheelchair lift assembly secured to floor track using manual leaf assemblies.

There may be instances where a structure can be secured with a single leaf. For instance, as shown in FIG. 6, a seat assembly may comprise two seat legs 1201, 1202, each of which may be secured using a single leaf 1101, 1102 that individually secure each seat leg 1201, 1202 in a separate parallel track. The seat legs 1201, 1202 may be secured together via the seat and possibly also additional connecting frame members that allow leaf 1101 and leaf 1102 to cooperate and apply equal and opposite lateral forces against the seat assembly for proper engagement with the track. As another example, as shown in FIG. 7, a single structure 2200 may include a flange 2202 for insertion into one of the undercuts in the track, which structure 2200 may be secured using a single leaf 2100 that engages with the other undercut.

Turning now to FIGS. 8-9 and 11-18, a first embodiment of a floor system 3000 for a vehicle is shown. The floor system 3000 may include at least one track 3001 attached to the floor of a vehicle. As shown, the floor system 3000 includes a plurality of parallel tracks 3001 that may be installed along at least a portion of the length of the vehicle. Although not shown, the tracks 3001 may each be independent structures attached to the floor of the vehicle via fasteners, such as bolts that extend through the vehicle floor. Ideally, other methods, structures, or materials for attaching the tracks 3001 may be used that do not require drilling holes through the floor of the vehicle, such as adhesives and/or welds (i.e., methods, structures, or materials that secure the panels 3050 to the floor in the absence of through-bolts).

Figure 13:
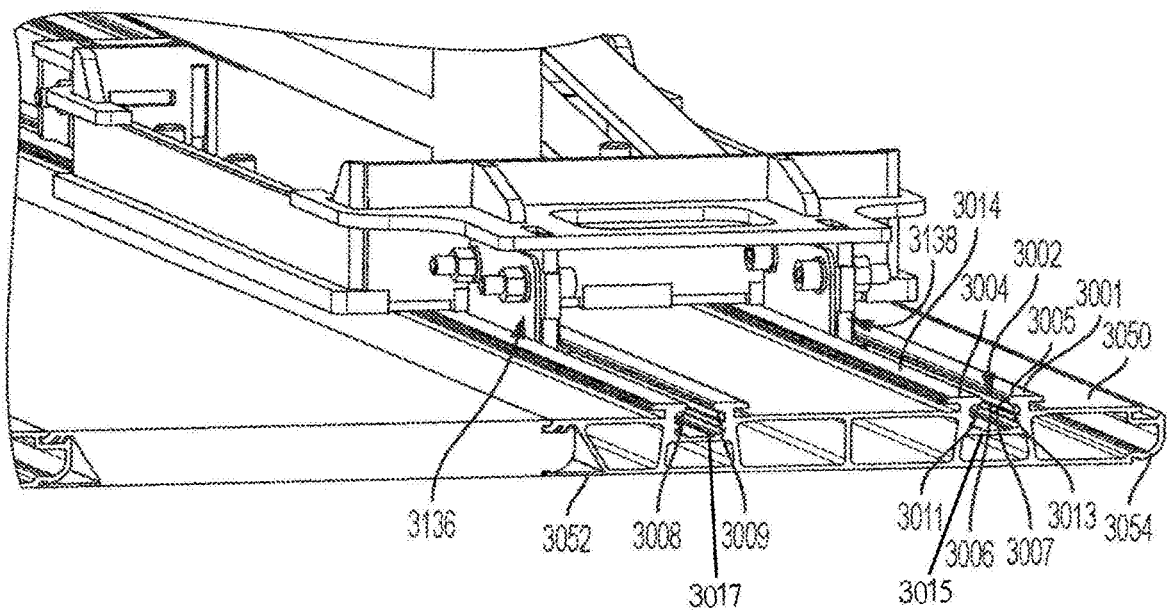
FIG. 13 is a front, right-side perspective view of the folding seat base for the folding seat assembly of FIG. 8 with the track shown.

In the shown embodiment, e.g., FIG. 13, the tracks 3001 are integral to extruded floor panels 3050 that are configured to lock together at their edges via female locking member 3052 and male locking member 3054. In some cases, as shown each floor panel 3050 may include a plurality of tracks 3001 (two tracks 3001 are integral to a single floor panel 3050 as shown in FIG. 13). In other embodiments, the panels 3050 may be attached together at their edges via other methods, such as adhesives or welds. The floor panels 3050 may be attached to the original floor of the vehicle via fasteners, such as bolts that extend through the floor of the vehicle. Ideally, other methods, structures, or materials for attaching the panels 3050 will be used that do not require drilling holes through the floor of the vehicle, such as adhesives and/or welds (i.e., methods, structures, or materials that secure the panels 3050 to the floor in the absence of through-bolts).

The track 3001 may take the form of the L-track 1 of FIG. 1. Alternatively, as best shown in FIG. 13, the track 3001 may resemble the L-track 1 of FIG. 1, in that it may be formed from extruded aluminum in a generally C-shape. An open channel 3002 extends lengthwise along the top surface of the track 3001 with undercuts 3011, 3013 extending under the top surface 3014 of the track to either side of the open channel 3002. In contrast to the track 1 of FIG. 1, the track 3001 omits holes 3, whereby the inwardly directed lips 3004, 3005 are continuous and linear—i.e., unscalloped. Each of the lips 3004, 3005 may be described as having opposing faces 3006, 3007 that may be generally vertical, continuous, and uninterrupted (unscalloped) and undersides 3008, 3009, that may be sloped relative to horizontal. Notably, the opposing faces 3006, 3007 and undersides 3008, 3009 may be oriented at other angles. The undersides 3008, 3009 may be described as having a root portion 3015, 3017 defined by the continuous longitudinal surface of the undersides 3008, 3009. Notably, the surface area of the root portion 3015, 3017 of track 3001 is substantially greater than the root portion 15, 17 of track 1 due to the omission of holes 3 in track 3001.

Figure 9:
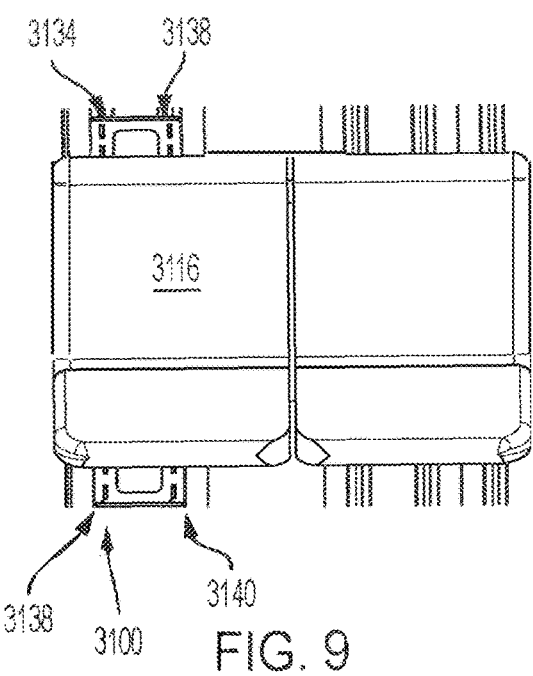
FIG. 9 is a top plan view of the folding (fold away) seat assembly of FIG. 8.
Figure 10:
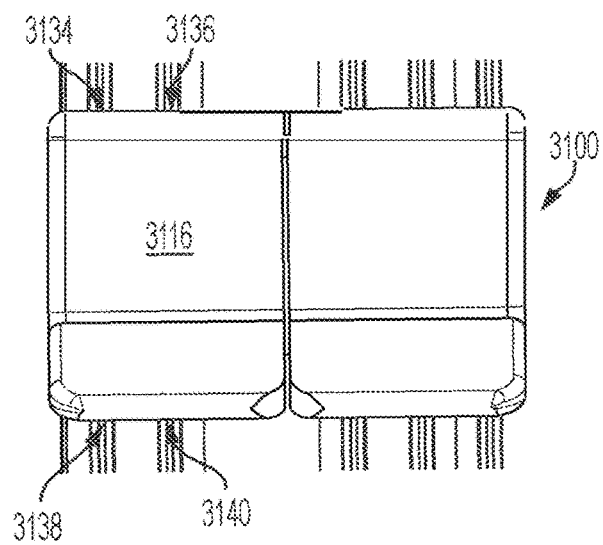
FIG. 10 is a top plan view of a second embodiment of a folding (fold away) seat assembly secured to a floor track using a manual leaf assembly.
Figure 11:
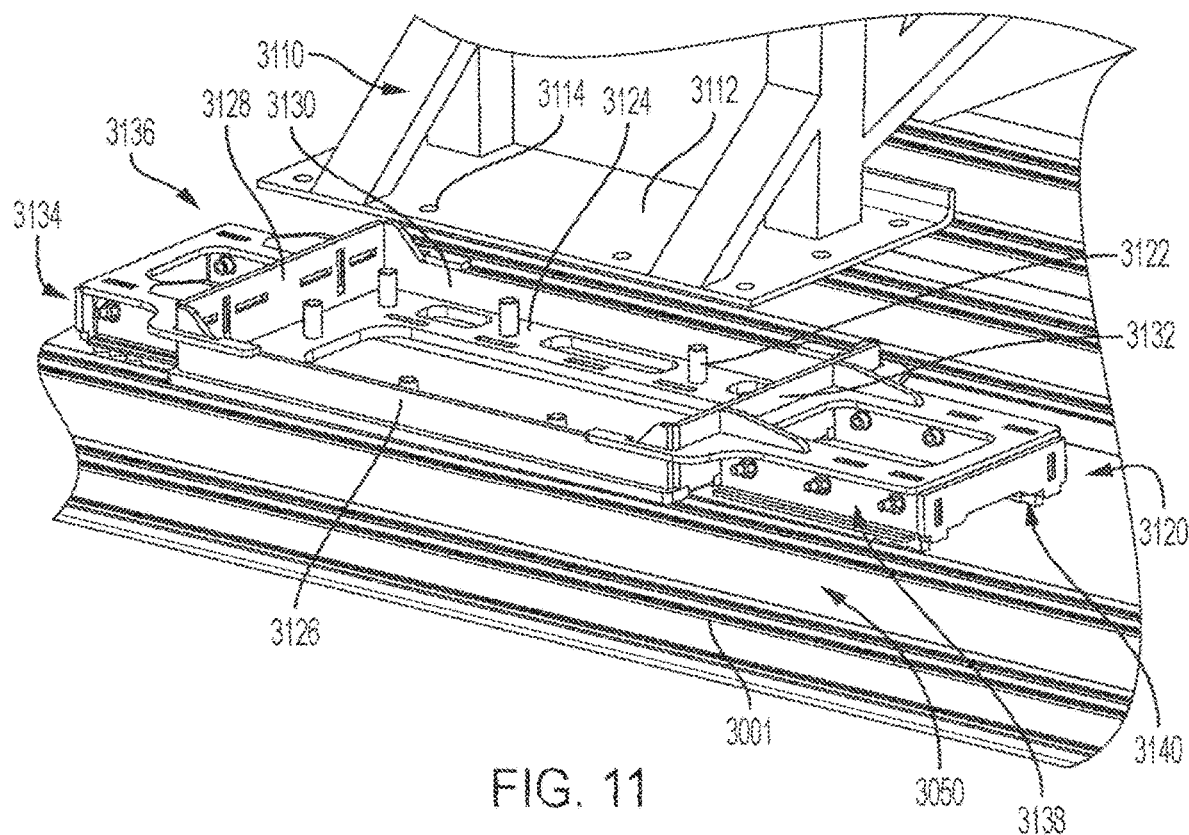
FIG. 11 is an exploded, rear-left side perspective view of the folding seat assembly of FIG. 8.

Turning more specifically to FIGS. 8-13, the floor system 3000 may include a folding (fold away) seat assembly 3100. The folding seat assembly 3100 includes a folding seat 3110 of the type that was designed to be bolted directly to the floor of a vehicle, whereby the bolts would extend through holes drilled through the floor of the vehicle. Examples of such folding seats 3110 include the GO-OES SpaceSaver Foldaway, 3PT Foldaway Seat, and AM/BV Foldaway, all manufactured and sold by Freedman Seating Company. As shown in FIG. 11, the folding seat 3110 includes a base member 3112 with a plurality of apertures 3114 that were intended by the manufacturer to receive bolts securing the folding seat 3110 directly to the floor of a vehicle (i.e., through-bolts). The folding seat assembly 3100 of the present invention, however, provides a "boltless"/"holeless" method of securing the folding seat 3110 to the vehicle floor.

More particularly, the folding seat assembly 3100 includes a folding seat base 3120 that connects the folding seat 3110 to at least one of the plurality of parallel tracks 3001 using one or more manual leaf fittings, rather than bolts extending through the vehicle floor. The folding seat base 3120 may, as shown, comprise multiple metal plates of various shapes and sizes that are welded together. The folding seat base 3120 may include a plurality of countersunk screw (or bolt) heads 3122 extending upward through a baseplate 3124, thereby defining a mounting location for the base member 3112. The screw heads 3122 may be presented in a pattern that matches the pattern of apertures 3114 on the base member 3112 of the folding seat 3110, whereby the base member 3112 may rest adjacent the baseplate 3124 with the screw heads 3122 received within the apertures 3114. Nuts or other locking members may then be applied to the screw heads 3122 to fix the folding seat 3110 to the folding seat base 3120.

To provide a strong, torsion-resistant connection between the folding seat base 3120 and folding seat 3110, the folding seat base 3120 may include one or more upwardly extending walls adjacent at least a portion of the perimeter of the base member 3112, including a first wall 3126, a second wall 3128, a third wall 3130, and a fourth wall 3132. The walls 3126, 3128, 3130, 3132 may be continuous about the perimeter of the base member 3112, as shown, thereby defining a box structure for receiving the base member 3112, or they may be discontinuous or segmented. The walls 3126, 3128, 3130, 3132 have the added benefit of providing structural rigidity for the folding seat base 3120 and, in that respect, upwardly extending walls may be provided even in locations spaced from the perimeter of the base member 3112.

The folding seat base 3120 includes at least one or more manual leaf fittings for securing the folding seat base 3120 to the track 3001, preferably at least a first manual leaf fitting longitudinally spaced along a vehicle length from a second manual leaf fitting. In the shown embodiment, in an orientation designed to provide a strong, torsion-resistant connection, two manual leaf fittings 3134, 3136 are provided forward of the mounting location for the base member 3112 and two manual leaf fittings 3138, 3140 are provided rearward of the mounting location for the base member 3112. As shown, the manual leaf fittings 3134, 3136, 3138, 3140 are substantially the same, except for the length and number of fasteners used, although that need not be the case.

Figure 12:
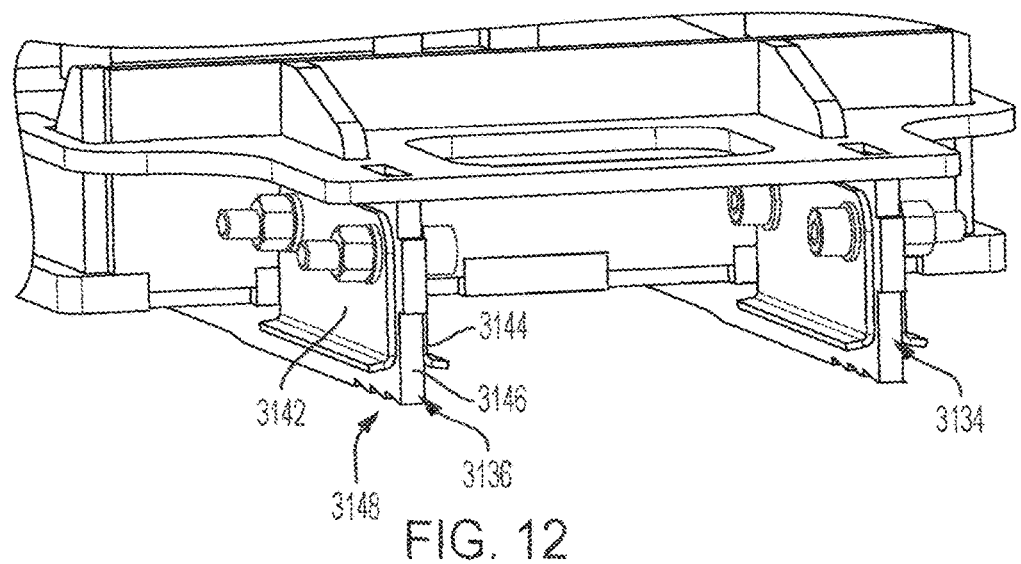
FIG. 12 is a front, right-side perspective view of a folding seat base for the folding seat assembly of FIG. 8, with the track hidden.

The front two manual leaf fittings 3134, 3136 are best seen in FIG. 12. Each of the fittings 3134, 3136 may comprise at least one and preferably two leaves 3142, 3144 that sandwich a plate structure 3146. In this case, the plate structure 3146 is integrally welded as part of the folding seat base 3120, although it may be a separate structure (as is the case for the wheelchair lift base 3220 described below). The leaves 3142, 3144 and plate structure 3146 are secured to the track in the same manner as described above for the manual leaf fitting 100 described above. In that regard, the baseplate 3124 may include access hole 3150 that permits insertion of leaf 3144 to the inside of plate structure 3146.

Each plate structure 3146 extends the entire length of the folding seat base 3120, from the fitting 3134 to fitting 3138 and from fitting 3136 to fitting 3140, although that need not be the case. Each plate structure 3146 may also include a track gripping structure, such as the saw tooth edge 3148 located at one or both of a front, lower edge and rear, lower edge of the plate structure 3146. In an accident, when the folding seat 3110 experiences a load from either the forward or rearward excursion of a seated passenger, the folding seat base 3120 may tilt forward or rearward, whereby the saw tooth edge 3148 will dig into the track base thereby preventing or resisting the folding seat base 3120 from sliding in the track 3001. Other track gripping structures may be utilized at other locations on the folding seat base 3120, including but not limited to the leaves 3142, 3144, for gripping other areas of the track, such as the lips 3004, 3005, undersides 3011, 3013, inner sidewalls, or top surface. Any embodiment of the manual leaf fitting described herein may include such a track gripping structure.

As shown by the top plan view of FIG. 9, portions of the folding seat base 3120 may extend forward and rearward of the seating surface 3116, which may present a tripping hazard. Ideally, the length of the folding seat base 3120 may be shortened, as shown in FIG. 10, whereby no portion extends forward of the seating surface 3116 and/or no portion extends rearward of the seating surface 3116.

Although the folding seat base 3120 has been described in the context of securing a folding seat 3110 to a vehicle floor, it is contemplated that the base 3120 can be used for securing any structure to a vehicle floor.

Figure 14:
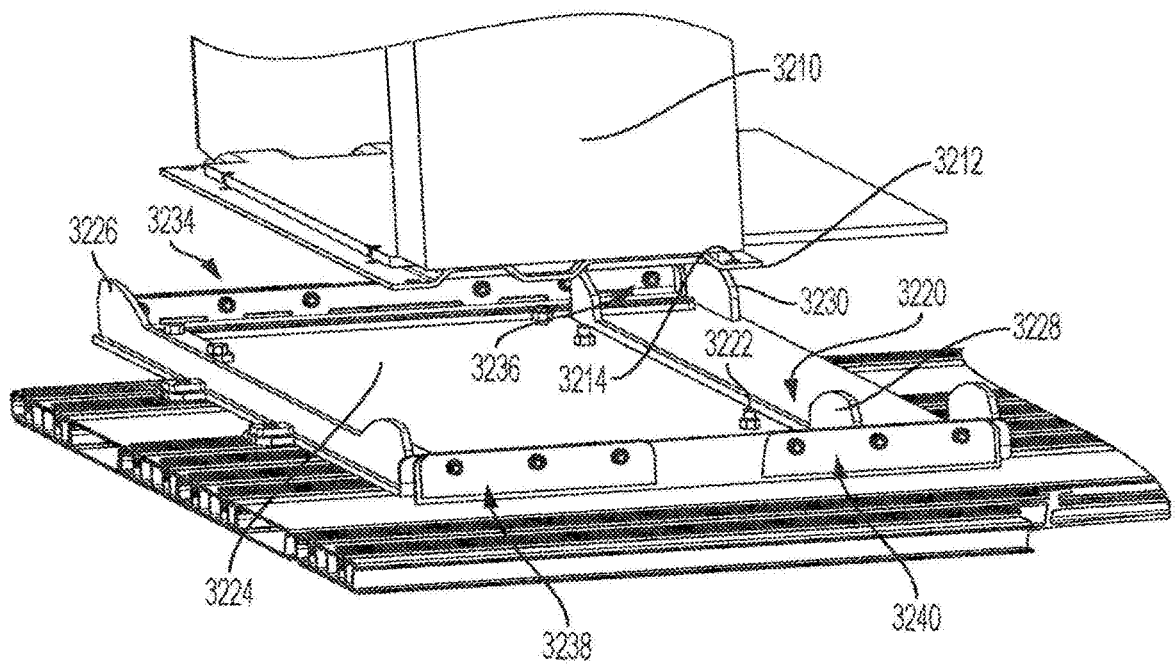
FIG. 14 is a rear, right-side exploded perspective view of the wheelchair lift assembly of FIG. 8.

Turning now to FIGS. 8 and 14-19, the floor system may also include a vehicle access device assembly 3200. The vehicle access device assembly 3200 includes a vehicle access device of any form, such as a ramp or, as shown schematically in the figures, a wheelchair lift 3210. Examples of such wheelchair lifts 3210 include the Braun-Ability Millennium Series, Century Series, Millenium 2, Century 2, Vista 2, NL500 and NUVL855 wheelchair lifts, all manufactured and sold by The Braun Corporation. As shown in FIG. 14, the wheelchair lift 3210 includes a base member 3212 with a plurality of apertures 3214 that were intended by the manufacturer to receive bolts securing the wheelchair lift 3210 directly to the floor of a vehicle (i.e., through-bolts). The folding seat assembly 3100 of the present invention, however, provides a "boltless"/"holeless" method of securing the folding seat 3110 to the vehicle floor.

More particularly, the vehicle access device assembly 3200 includes a wheelchair lift base 3220 that connects the wheelchair lift 3210 to at least one of the plurality of parallel tracks 3001 using one or manual leaf fittings, rather than bolts extending through the vehicle floor. The wheelchair lift base 3220 may, as shown, comprise multiple metal plates of various shapes and sizes that are welded together. The wheelchair lift base 3220 may include a plurality of countersunk screw (or bolt) heads 3222 extending upward through a baseplate 3224, thereby defining a mounting location for the base member 3212. The screw heads 3222 may be presented in a pattern that matches the pattern of apertures 3214 on the base member 3212 of the wheelchair lift 3210, whereby the base member 3212 may rest adjacent the baseplate 3224 with the screw heads 3222 received within the apertures 3214. Nuts or other locking members may then be applied to the screw heads 3222 to fix the wheelchair lift 3210 to the folding seat base 3220.

To provide a strong, torsion-resistant connection between the wheelchair lift base 3220 and wheelchair lift 3210, the wheelchair lift base 3220 may include one or more upwardly extending walls adjacent at least a portion of the perimeter of the base member 3212, including a first wall 3226 and a second wall 3228. The walls 3226, 3228 may be continuous about the perimeter of the base member 3212, thereby defining a box structure for receiving the base member 3212, or they may be discontinuous or segmented. The walls 3226, 3228 have the added benefit of providing structural rigidity for the wheelchair lift base 3220 and, in that respect, upwardly extending walls may be provided even in locations spaced from the perimeter of the base member 3212, such as wall 3230.

The folding seat base 3220 includes at least one or more manual leaf fittings for securing the folding seat base 3220 to the track 3001, preferably at least a first manual leaf fitting laterally spaced along a vehicle width from a second manual leaf fitting. In the shown embodiment, in an orientation designed to provide a strong connection, two manual leaf fittings 3234, 3236 are provided on a left side of the mounting location for the base member 3212 and two manual leaf fittings 3238, 3240 are provided on a right side of the mounting location for the base member 3212. As shown, the manual leaf fittings 3234, 3236, 3238, 3240 are substantially the same, although that need not be the case.

Figure 16:
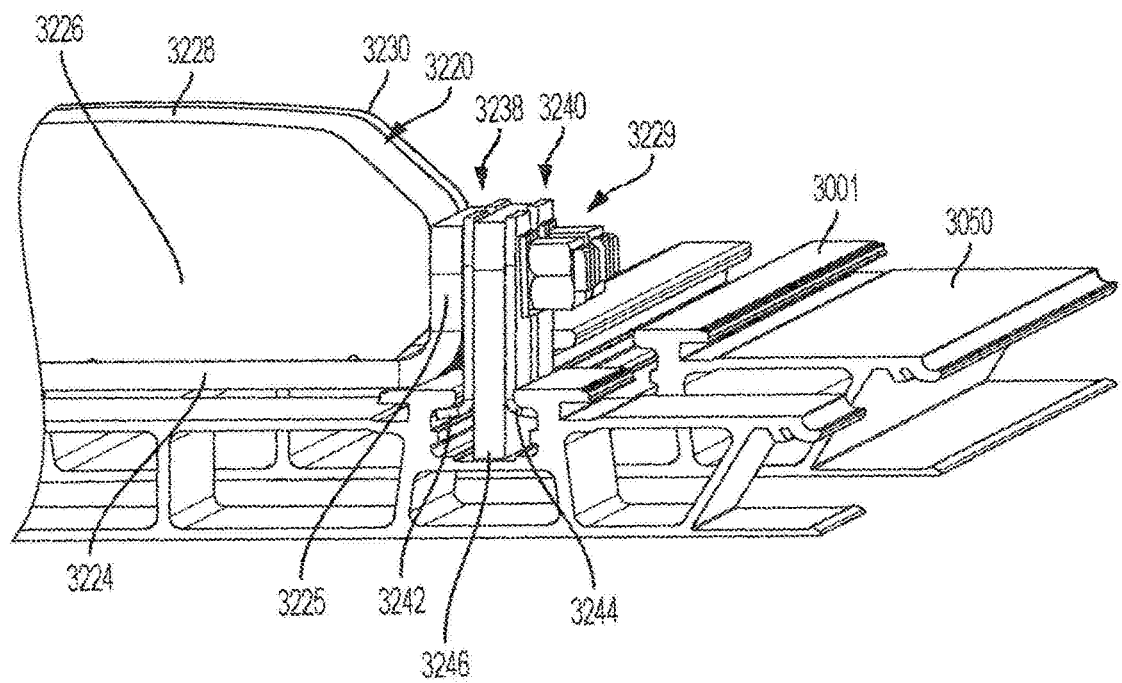
FIG. 16 is a rear, right-side perspective view of the wheelchair lift base for the wheelchair lift assembly of FIG. 8, with the track shown.
Figure 17:
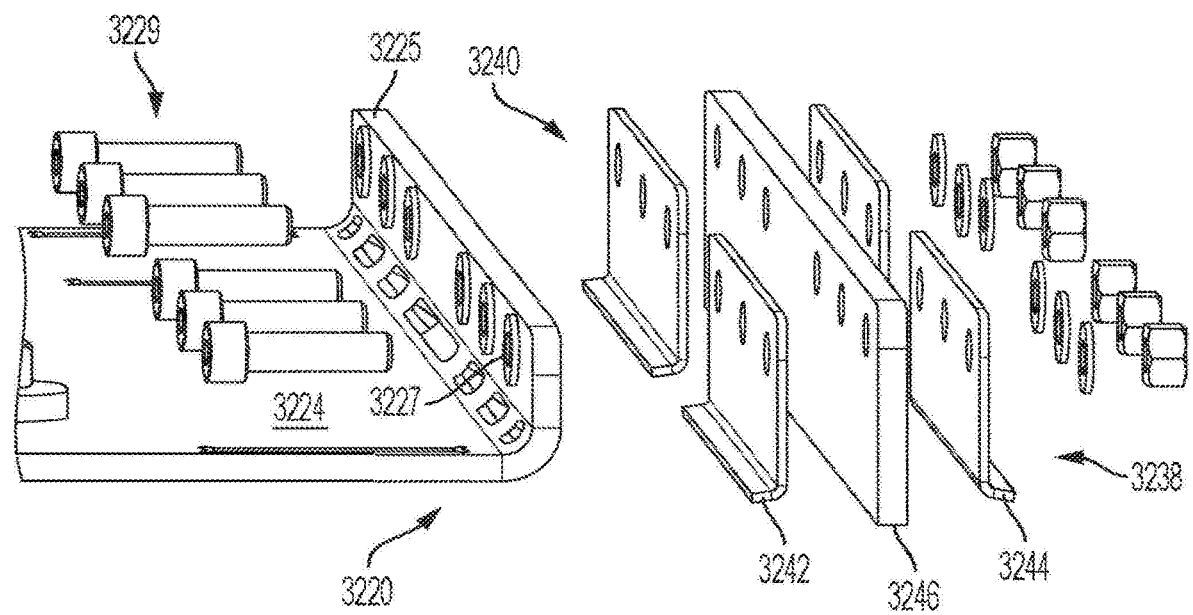
FIG. 17 is a rear, right-side exploded perspective view of the wheelchair lift base for the wheelchair lift assembly of FIG. 8, with the track hidden.
Figure 18:
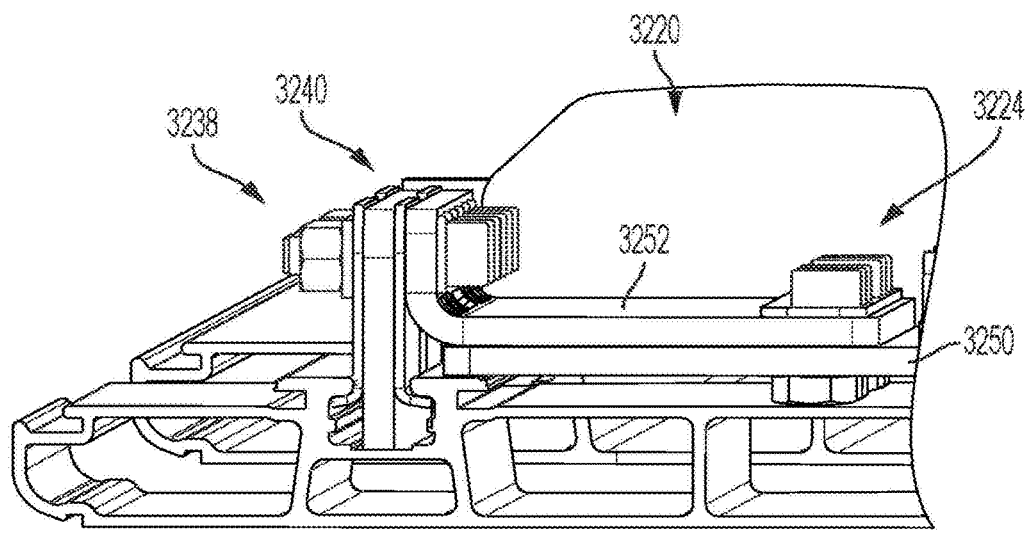
FIG. 18 is a rear, left-side perspective view of the wheelchair lift base for the wheelchair lift assembly of FIG. 8, with the track shown.
Figure 19:
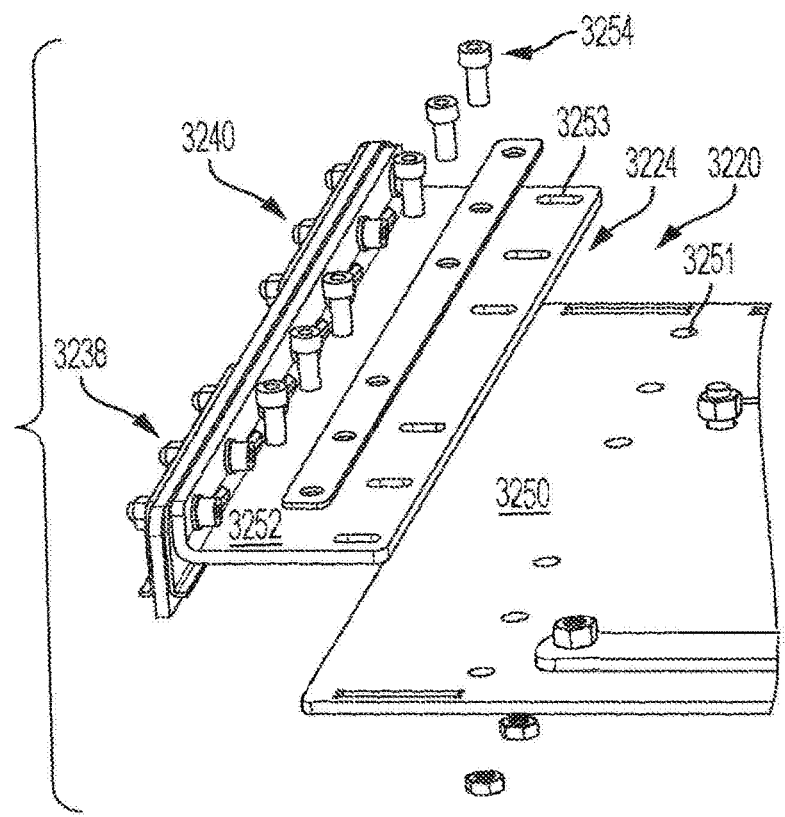
FIG. 19 is a rear, left-side exploded perspective view of the wheelchair lift base for the wheelchair lift assembly of FIG. 8, with the track hidden.

The right two manual leaf fittings 3238, 3240 are best seen in FIGS. 16-17. Each of the fittings 3238, 3240 may comprise at least one and preferably two leaves 3242, 3244 that sandwich a plate structure 3246. In this case, the plate structure 3246 is a separate component from the remainder of the wheelchair lift base 3220, e.g., the mounting location or baseplate 3220, although it may be an integral structure (as is the case for the folding seat base 3120 described above). The leaves 3242, 3244 and plate structure 3246 are secured to the track in the same manner as described above for the manual leaf fitting 100 described above. To facilitate a connection between the fittings 3238, 3240, the baseplate 3224 may include a connecting wall 3225 that includes apertures 3227 aligned with corresponding apertures in the leaves 3242, 3244 and plate structure 3246. In that regard, common fasteners 3229 may be used to connect the connecting wall 3225, leaves 3242, 3244, and plate structure 3246, with the connecting wall sitting flush against the outside surface of one of the leaves 3242, 3244. Where only a single leaf 3242 or 3244 is used, the connecting wall 3225 may sit flush against the outside surface of one of the single leaf 3242 or 3244 or the plate structure 3246. The connecting wall 3225 may be a vertical wall that is welded to the baseplate 3224 or, as shown, may be a bent portion of the baseplate 3224. Fittings 3234 and 3236, on the left side of the wheelchair lift base 3220, may be secured to the baseplate 3224 in the same or similar way, as shown in FIG. 18-19.

Each plate structure 3246 may extend the entire length of the wheelchair lift base 3220, from the fitting 3238 to fitting 3240 and from fitting 3234 to fitting 3236, although that need not be the case. Each plate structure 3246, or other portion of the wheelchair lift base 3220, may also include a track gripping structure similar to the saw tooth edge 3148 of the folding seat base 3120.

Figure 15:
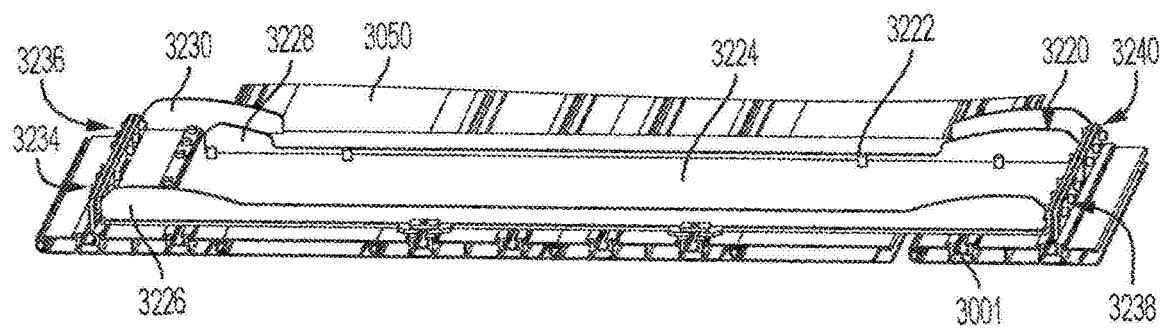
FIG. 15 is a rear perspective view of a wheelchair lift base for the wheelchair lift assembly of FIG. 8.

As shown best in FIG. 15, the wheelchair lift base 3220 may be wide and span multiple tracks 3001 and multiple panels 3050. To account for tolerance stacking that will affect the distance between the track 3001 used by fittings 3234 and 3236, on the one hand, and the track used by fittings 3238 and 3240, the wheelchair lift base 3220 may be width adjustable, whereby the distance between the connecting walls 3225 on the left side and right side of the baseplate 3224 may be adjusted. With particular reference to FIGS. 18-19, in one embodiment, the baseplate may be formed in at least two sections, a first section 3250 and a second section 3252. The first section 3250 and the second section 3252 may be connected at various locations relative to each other, whereby the distance between the connecting walls 3225 can be increased and decreased to match the distance between tracks 3001. In the example shown, a sliding connection is present between the first and second sections 3250, 3252. More particularly, the first section 3250 includes a plurality of apertures 3251, while the second section 3252 includes a plurality of slotted apertures 3253 which overlie the plurality of apertures 3251. Fasteners 3254 may be used through the apertures 3251 and slotted apertures 3253 to secure the two sections 3250, 3252 of the baseplate 3224 together. The slotted nature of slotted apertures 3253 allows the second section 3252 to be slid left and right relative to the first section 3250, whereby the distance between the connecting walls 3225 can be increased and decreased to match the distance between tracks 3001.

Although the wheelchair lift base 3220 has been described in the context of securing a wheelchair lift 3210 to a vehicle floor, it is contemplated that the base 3220 can be used for securing any structure to a vehicle floor.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

The invention claimed is:

1. A track fitting for securing a structure to a track, the track having an open-top channel defined by two inwardly directed lips and two undercuts to either side of the open-top channel, the track fitting comprising at least one flange member having a flange portion that depends at an angle from a connecting portion, and at least one fastener for connecting the connecting portion to the structure, wherein the connecting portion is a levering portion configured to lever the flange portion into engagement with at least one of an underside of at least one of the two inwardly directed lips and an outside face of at least one of the two undercuts as the fastener secures the levering portion to the structure outside of the open-top channel, whereby the flange member is pre-loaded to provide a clamping force to resist movement of the structure relative to the track.

2. The track fitting of claim 1, wherein the structure comprises a substantially planar portion adapted for insertion into the open-top channel.

3. The track fitting of claim 2, wherein the substantially planar portion is oriented generally parallel to a plane defined by two opposing faces of the two inwardly directed lips.

4. The track fitting of claim 2, further comprising a second flange member having a second flange portion that depends at an angle from a second levering portion, wherein the first levering portion and the second levering portion sandwich the substantially planar portion, wherein the second levering portion is configured to lever the second flange portion into engagement with at least one of an underside of the other of the two inwardly directed lips and an outside face of the other of the two undercuts as the fastener secures the second levering portion to the structure outside of the open-top channel, whereby the second flange member is pre-loaded to provide a clamping force to resist movement of the structure relative to the track.

5. The track fitting of claim 1, wherein the levering portion of the flange member is disposed substantially adjacent to a substantially planar portion of the structure in a connected position.

6. The track fitting of claim 1 in combination with; the structure, wherein a lower section of the structure includes a second flange portion configured for receipt within the other of the two undercuts.

7. The track fitting of claim 1, further comprising a second flange member having a second flange portion that depends at an angle from a second levering portion, wherein the at least one fastener connects the second levering portion to an opposite side of the structure, wherein the second levering portion is configured to lever the second flange portion into engagement with at least one of an underside of the other of the two inwardly directed lips and an outside face of the other of the two undercuts as the fastener secures the second levering portion to the structure outside of the open-top channel, whereby the second flange member is pre-loaded to provide a clamping force to resist movement of the structure relative to the track.

8. The track fitting of claim 1, wherein the at least one flange member includes a second flange portion that depends at a second angle from an upper end of the levering portion.

9. The track fitting of claim 8, wherein the angle and the second angle are different, whereby the at least one flange member can be used in a flange-portion-down position in a first track of a first geometry and in a second-flange-portion-down position in a second track of a second, different geometry.

10. The track fitting of claim 8, wherein the second flange portion extends from an upper end of the levering portion with a first geometry, while the flange portion extends at a second, different geometry from a lower end of the levering portion, whereby the at least one flange member can be used in a flange-portion-down position in a first track of a first geometry and in a second-flange-portion-down position in a second track of a second, different geometry.

11. The track fitting of claim 10, where the first and second geometries are a first length of the flange portion and a second, different length of the second flange portion.

12. The track fitting of claim 1, wherein a length of the at least one flange member is configured to be aligned parallel with a length of the open-top channel in a connected position.

13. The track fitting of claim 1 in combination with the track.

14. The track fitting of claim 13, wherein the track includes a plurality of holes along the length of the open-top channel, whereby the two inwardly directed lips have a scalloped geometry.

15. The track fitting of claim 14 in combination with the structure, wherein the structure includes a peg adapted for receipt within at least one of the plurality of holes.

16. The track fitting of claim 13, wherein the two inwardly directed lips have a non-scalloped geometry.

17. The track fitting of claim 1 in combination with the structure, wherein the structure includes a foot for engaging with the track to resist longitudinal movement along a length of the track.

18. The track fitting of claim 1, wherein the levering portion is configured to lever the flange toward engagement with the outside face.

19. The track fitting of claim 18, wherein the levering portion is also configured to lever the structure into engagement with a bottom surface of the open-top channel as the fastener secures the levering portion to the structure.

20. The track fitting of claim 18, where an interface between the flange portion and the levering portion is a bend, the bend serving as a fulcrum.

21. The track fitting of claim 2, wherein the levering portion, when connected to the substantially planar portion, creates a clamping force with the flange portion engaged with the outside face and the substantially planar portion engaged with a bottom surface of the open-top channel.

22. The track fitting of claim 1 in combination with the structure, wherein the structure is a seat leg.

23. The track fitting of claim 1 in combination with the structure, wherein the structure is a wheelchair lift.

24. The track fitting of claim 1 in combination with the structure, wherein the structure is a wheelchair ramp.

25. A method for using the track fitting of claim 1, the method comprising the steps of: inserting the at least one flange member into the open-top channel and securing the levering portion to the structure with the at least one fastener whereby: the levering portion is angled toward the structure, the levering portion levers the flange portion into engagement with at least one of the underside and the outside face, and the flange member is pre-loaded to provide a clamping force to resist movement of the structure relative to the track.

26. The method of claim 25, further comprising the step of inserting the structure into the open-top channel, wherein the at least one flange member and the structure are inserted simultaneously.

27. The method of claim 25, further comprising the step of inserting the structure into the open-top channel, wherein the at least one flange member and the structure are inserted in any order.

28. The method of claim 25, wherein a quantity of the at least one flange member is at least two flange members, where a first and a second of the at least two flange members sandwich the structure in a connected position.

29. A floor system in a vehicle comprising:
- a plurality of tracks each having an open-top channel defined by two inwardly directed lips, the plurality of tracks being attached to a floor of the vehicle in the absence of a through-bolt;
- a vehicle access device being secured to at least one of the plurality of tracks, whereby the vehicle access device is attached to the floor of the vehicle in the absence of the through-bolt; and,
- at least one passenger seat being secured to at least one of the plurality of tracks, whereby the at least one passenger seat is attached to the floor of the vehicle in that absence of the through-bolt;
- wherein at least one of the vehicle access device and the passenger seat are connected to at least one of the plurality of tracks using the track fitting of claim 1.

30. The track fitting of claim 1, further comprising a second flange member for securing a structure to a second track, the second track having an open-top channel defined by two inwardly directed lips and two undercuts to either side of the open-top channel, the second flange member having a second flange portion that depends at a second angle from a second levering portion, wherein at least one fastener connects the second levering portion to an opposite side of the structure, wherein the second levering portion is configured to lever the second flange portion into engagement with at least one of an underside of at least one the two inwardly directed lips of the second track and an outside face of at least one of the two undercuts of the second track as the fastener secures the second levering portion to the structure outside of the open-top channel, whereby the second flange member is pre-loaded to provide a clamping force to resist movement of the structure relative to the second track.

31. The method of claim 25, further comprising the steps of:
- inserting a second flange member into an open-top channel of a second track, the open-top channel of the second track being defined by two inwardly directed lips and two undercuts to either side of the open-top channel, the second flange member having a second flange portion that depends at a second angle from a second levering portion; and
- securing the second levering portion to the structure with at least one fastener whereby: the second levering portion is angled toward the structure, the second levering portion levers the second flange portion into engagement with at least one of the an underside of at least one the two inwardly directed lips of the second track and an outside face of at least one of the two undercuts of the second track, and the second flange member is pre-loaded to provide a clamping force to resist movement of the structure relative to the second track.

* * * * *